Nov. 21, 1933.  R. OLIVER ET AL  1,936,521
NESTING CONTAINER AND METHOD OF MAKING THE SAME
Filed May 18, 1931  4 Sheets-Sheet 4

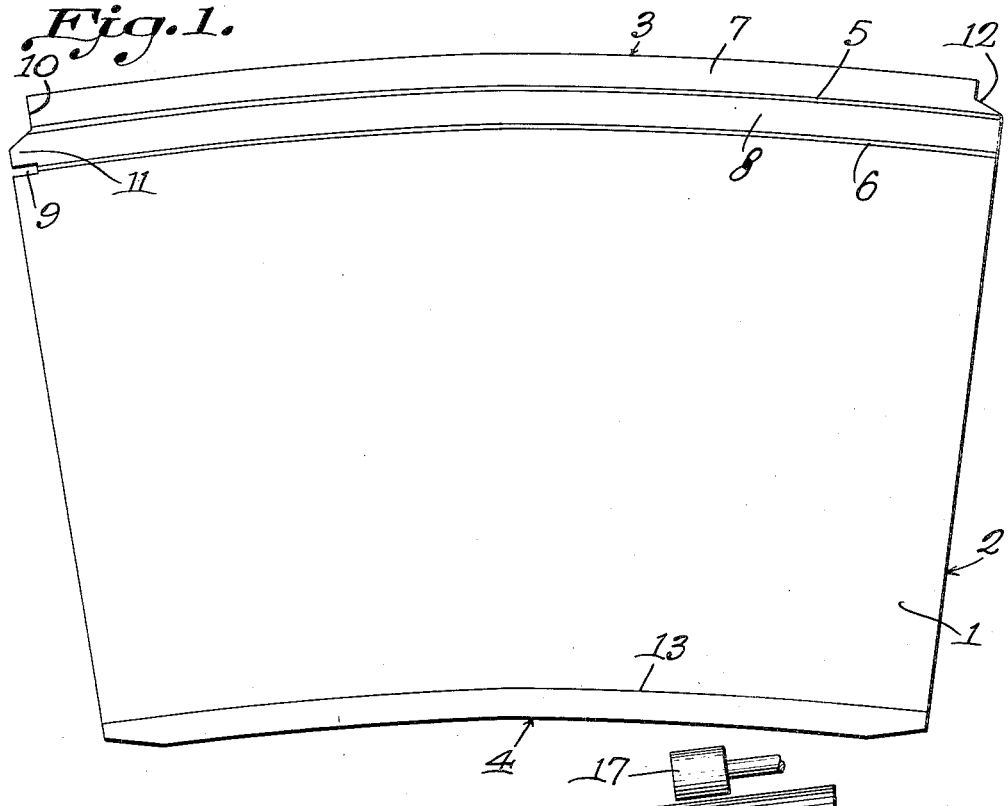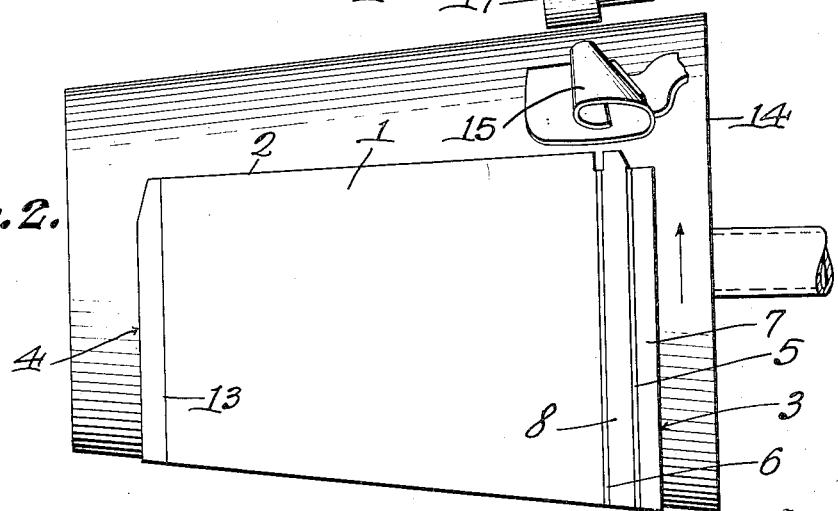

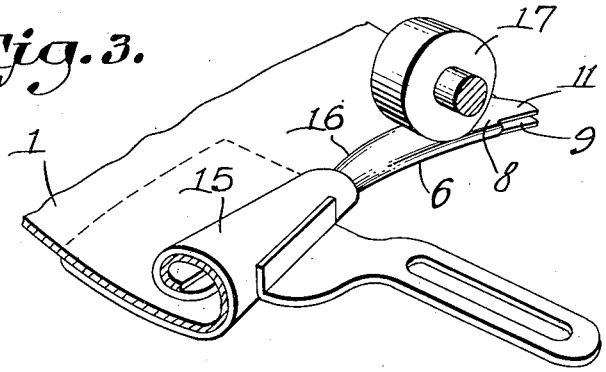
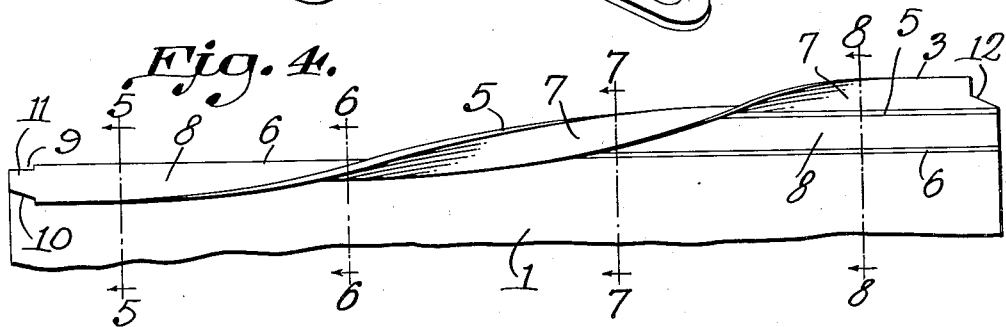
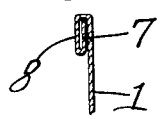 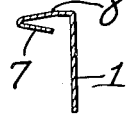  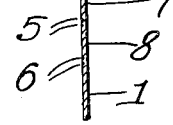
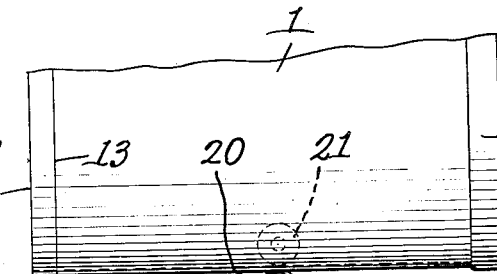
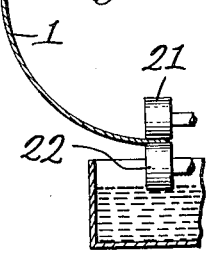
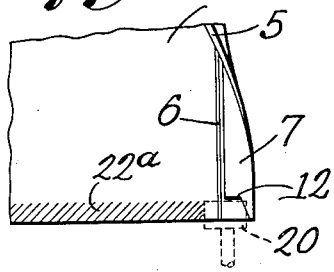
Ruth Oliver and George R. Penn, Inventors Nov. 21, 1933. R. OLIVER ET AL 1,936,521
NESTING CONTAINER AND METHOD OF MAKING THE SAME
Filed May 18, 1931   4 Sheets-Sheet 3
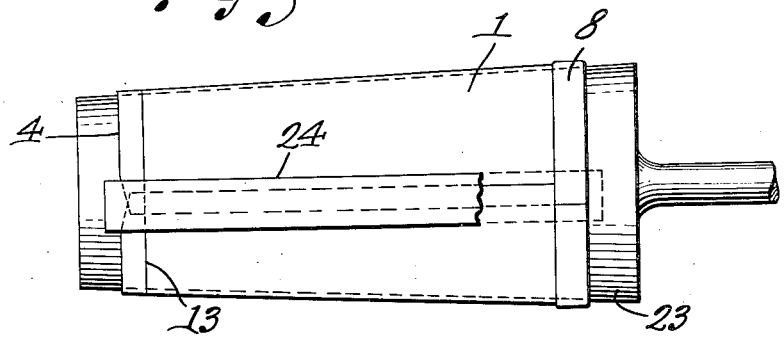
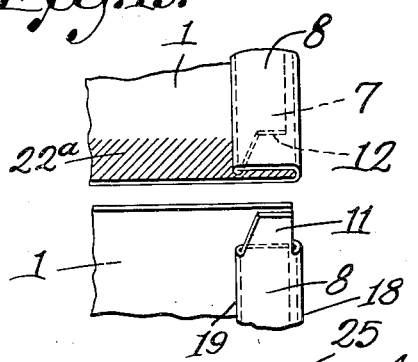
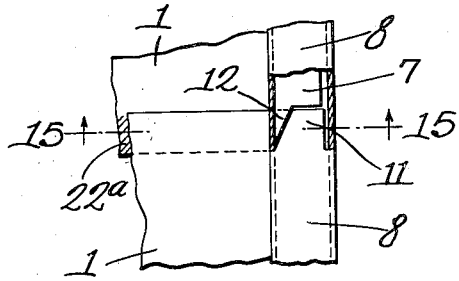
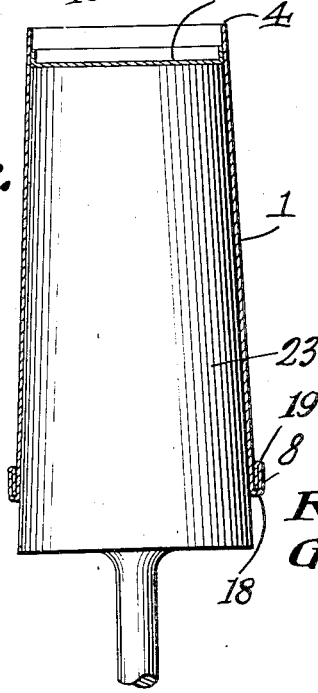
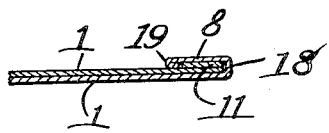
Ruth Oliver and George R. Penn, Inventors
By C. A. Snow & Co.
Attorneys.

Ruth Oliver and George R. Penn Inventors

By C.A.Snow&Co.
Attorneys.

Patented Nov. 21, 1933

1,936,521

UNITED STATES PATENT OFFICE 1,936,521

NESTING CONTAINER AND METHOD OF MAKING THE SAME

Ruth Oliver and George R. Penn, New York, N. Y., assignors, by direct and mesne assignments, to Oswego Falls Corporation, Fulton, N. Y., a corporation of New York Application May 18, 1931. Serial No. 538,324

13 Claims. (Cl. 93—49)

This invention relates to a container and to a method of producing the same, one of the objects being to provide slightly tapered frusto-conical containers which can be nested compactly so as to be shipped and stored conveniently but which do not possess the objectionable characteristics of similar containers heretofore produced.

Thus far it has been the practice to shape a blank into the desired tapered form and subsequently turn over the edge at the large end by spinning. The resultant article has been objectionable for several reasons.

It is an object of the present invention to produce a tapered container the open end of which is reinforced by a smooth compact fold produced in a new and novel manner.

A further object is to so shape the blank from which the container is produced as to maintain a uniform thickness throughout the circumference of the container at the fold, thereby eliminating the bulge ordinarily produced where the edges of the blank lap.

Another object is to provide an improved means for applying adhesive at the proper points to insure a tight seam.

A still further object is to form the container with an annularly expanded portion for supplementing the sealing and reinforcing action of the fold and improving the appearance of the container, said portion also serving as a spacer for holding the greater portions of the surfaces of the containers out of contact while nested, thereby facilitating withdrawal of the containers one from another.

With the foregoing and other objects in view which will appear as the description proceeds the invention resides in certain novel details of construction and certain steps of the method herein-after more fully described and pointed out in the claims, it being understood that changes may be made without departing from the scope of the appended claims.

In the accompanying drawings have been illustrated the several steps of the method, and the article produced thereby.

In said drawings:

Figure 1 is a plan view of a blank cut and scored to produce a tapered container.

Figure 2 is a view of the blank supported on a conical surface for hemming.

Figure 3 is a perspective view of a portion of the blank illustrating the hemming operation.

Figure 4 is a plan view of a portion of the blank showing different stages of the hemming operation.

Figure 5 is a section on line 5—5, Figure 4.

Figure 6 is a section on line 6—6, Figure 4.

Figure 7 is a section on line 7—7, Figure 4.

Figure 8 is a section on line 8—8, Figure 4.

Figure 9 is a side view of a portion of the blank in operative relation with glueing mechanism.

Figure 10 is an end view thereof.

Figure 11 is a bottom view of the structure in Figure 9 showing the application of an adhesive to the inner faces of the hem at one edge.

Figure 12 is a plan view of the blank showing it completely folded on a mandrel and held at the seam while setting.

Figure 13 is a plan view of the hem joint with the parts separated.

Figure 14 is a plan view of the hem joint assembled, the outer thickness of the hem being broken away.

Figure 15 is a section on line 15—15, Figure 14.

Figure 16 is a section through a portion of the container showing the bottom seated therein.

Figure 17:
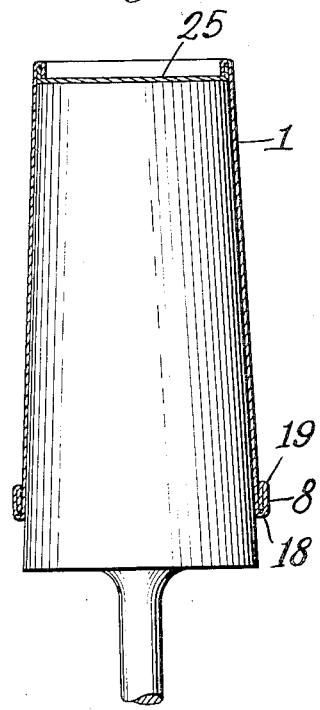
Figure 17 is a similar view showing the edge of the container turned inwardly on to the bottom.
Figure 18:
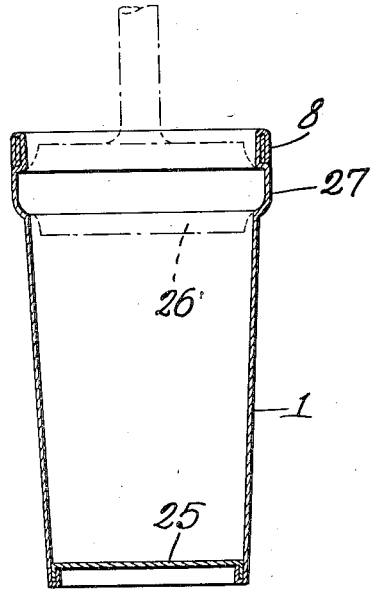
Figure 18 is a section through the top end of the container illustrating the step of pressing an annular bead therefrom.
Figure 19:
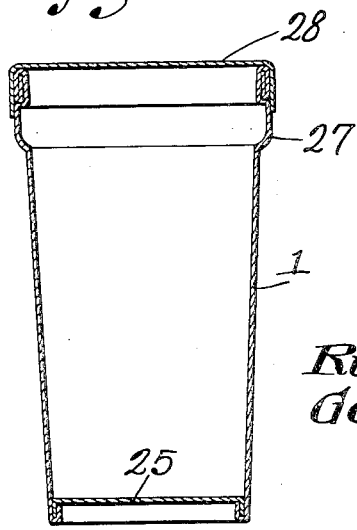
Figure 19 is a section through the finished container with its over-all cap in position.

Referring to the figures by characters of reference, 1 designates a blank formed of suitable paper stock properly treated and cut with side edges 2 converging toward one end so as to lap in parallel relation when the blank is bent into frusto-conical or tapered form. The end edges of the blank are arcuate as shown at 3 and 4 so that when the blank is bent to proper shape the ends of the container will occupy parallel planes.

That end of the blank 1 nearest edge 3 is scored along lines parallel with the edge, as shown at 5 and 6 dividing the blank into an edge portion 7 and an intermediate portion 8. Preferably a pair of closely arranged scores 5 are provided and also a pair of scores 6.

A slot 9 is cut into the blank at one end of the scores 6 and the blank is cut away at one end of the portion 7 as indicated at 10 so that a short tongue 11 is thus provided which extends across the end of the blank portion 8. The opposite end of the portion 7 is cut away to form a recess 12 of the same size and proportions as tongue 11 but oppositely arranged.

Adjacent to and parallel with the edge 4 there is provided a score 13.

In practice the blank is placed on a conical holder 14 to which it can be held by suction or other means. Thus the blank will be maintained in an arcuate or transversely curved position at which time the blank portions 7 and 8 will be fed into one end of a hemmer 15. This will cause the blank to be bent along its wide end into a tube and the parts can be so adjusted that, as the tubular portion 16 emerges from the hemmer and passes under a flattening shoe or roller 17 a hem will be produced with the portion 7 forming the inner fold and the portion 8 forming the outer fold. The provision of the scores in pairs results in the formation of substantially square edges along the hem as shown at 18 and 19, the latter edge producing an abrupt shoulder. As the hemming operation is effected while the blank is in a curved position, there will be no crimping or crumpling action upon the stock such as would be produced should an attempt be made to form a curved hem on a flat blank. Instead the resultant hem will be perfectly smooth and compact. Furthermore the recess 12 will be so located between blank 1 and fold 8 that tongue 11 can be inserted thereinto when the opposed edge portions 2 are brought into lapped relation.

Following the hemming of the blank the edge 2 opposite tongue 11 is fed longitudinally over an adhesive applying means. This can consist of a glue applying roller 22 adapted to engage the outer surface of the blank along said edge. The blank can be held to roller 22 by a presser roller 21. Both rollers can be used to feed the blank longitudinally. As the blank is about to pass from between the rollers the applying roller 22 will enter between the fold 8 and blank 1 at the end of the hem and will also enter recess 12. Thus the end of the hem will momentarily be unfolded at which time adhesive will be applied to those surfaces of the folds 8 and 7 in the path of the roller 22.

As the blank with the applied adhesive shown at 22a becomes released from the applying means it is placed on a form 23 having the proper taper of the completed container. The blank can be held thereto by suction or other suitable means. As the blank is pressed or drawn about forms 23 the edges 2 will lap with the adhesive between them and the tongue 11 will enter recess 12. The lapping portions can be pressed together by a suitable clamp 24 and held until joined properly.

Following the operation described a bottom closure in the form of a flanged disk 25 is forced into the bottom end of the formed blank so as to seat against former 23 with the free edge of the disk flange flush with the score 13. That portion of the blank 1 between edge 4 and score 13 is then turned over the flange of the bottom disk to form a joint of the desired type.

The next step in the formation of the container consists in the insertion of an expansible former 26 into the open end of the device so as to produce an annular bulge or enlargement 27 which will extend close to and tend to partly conceal shoulder 19. The outermost portion of the enlargement will be flush with the outer surface of the hem and will thus cooperate with said hem to provide a smooth broad surface for tight engagement by the flange of an over-all cap 28.

By providing recess 12 for tongue 11 the hem will be of the same thickness throughout the circumference of the container. Thus there will be no protruding portion at the hem joint which would prevent a tight sealing contact with an over-all cap.

Although we have described the formation of a hem having two folds it is to be understood that the number of folds can be reduced or increased without departing from the present invention.

What is claimed is:

1. The method of forming a container from paper stock which includes the step of hemming one edge portion of a blank while it is held in a curved position.

2. The method of forming a container from sheet paper stock which includes the step of bending the blank to provide an arcuate edge portion and then hemming said edge portion in the direction of its length while curved.

3. The method of forming a tapered container from sheet paper stock which includes the steps of forming a blank with an arcuate edge, curving the blank to bring all portions of said edge substantially into the same plane, and then hemming the blank longitudinally of said edge while in such position.

4. The method of forming a tapered container from sheet paper stock which includes the steps of forming a blank with an arcuate edge, curving the blank to bring all portions of said edge substantially into the same plane, and then folding said edge outwardly onto the blank while in such position, thereby to produce a smooth hem on the outer or convex surface of the blank.

5. The method of forming a tapered container from sheet paper stock which includes the steps of shaping a blank with converging side edges and arcuate end edges, scoring the blank transversely adjacent to one of the arcuate edges to define parallel fold portions, curving the blank transversely to bring all portions of one arcuate edge into the same plane, and subsequently folding the blank outwardly along the scores while the blank is curved thereby to produce a smooth hem upon the outer or convex surface of the blank.

6. The method of forming a tapered container from sheet paper stock which includes the steps of shaping a blank with converging side edges and arcuate end edges, scoring the blank transversely adjacent to one of the arcuate edges to define parallel fold portions, curving the blank transversely to bring all portions of one arcuate edge into the same plane, and subsequently folding the blank outwardly along the scores while the blank is curved thereby to produce a smooth hem upon the outer or convex surface of the blank, subsequently applying an adhesive longitudinally of one side edge and within one end portion of the hem, and finally lapping the side edges and interfitting the ends of the hem.

7. The method of forming a tapered container from sheet paper stock which includes the steps of shaping a blank with converging side edges and arcuate end edges, scoring the blank transversely adjacent to one of the arcuate edges to define parallel fold portions, curving the blank transversely to bring all portions of one arcuate edge into the same plane, subsequently folding the blank outwardly along the scores while the blank is curved thereby to produce a smooth hem upon the outer or convex surface of the blank, and finally expanding a portion of the container annularly adjacent to the hem.

8. In the method of forming a tubular container body from flexible sheet stock; those steps which include forming a blank with opposite ends to overlap in the provision of a longitudinal seam extending throughout the length of the completed body, notching the corner portion of one end of said blank, notching the corresponding corner portion of the other end of said blank to provide a tongue, hemming the longitudinal portion of said blank that includes said notched corners to provide a hem at one end having said tongue and at the other end having a recess to receive said tongue, compressing said hem, and finally overlapping said ends and bringing together the ends of the hem with the tongue fitting in the recess and securing said overlapping portions while the blank is in final tubular form.

9. In the method of forming a tubular longitudinally tapered container body having a seam or joint extending longitudinally throughout its length; those steps which include forming a flexible sheet blank with converging end edges and curved concave and convex longitudinal edges, hemming the longitudinal convex curved edge portion of the blank to form the same with an exterior hem throughout the length thereof, and bringing together the ends of the blank and the ends of the hem while the blank is held in tapered tubular form and securing said ends together to form the longitudinal seam throughout the length of the blank.

10. In the method of forming a longitudinal tapered tubular container body composed of flexible sheet material; those steps which include providing a blank of flexible sheet material having converging end edges and curved longitudinal edges, hemming one of said curved longitudinal edge portions of the blank by relative longitudinal movement between said blank and a hemmer, compressing the hem thus formed, and finally forming the blank into final tubular tapered form with its ends overlapping and secured together to form a tight seam.

11. In the method of forming a tapered tubular container body from flexible sheet material; those steps which include providing a flexible sheet material blank with converging end edges and concaved and convex longitudinal edges, hemming said convex longitudinal edge to provide the same with a multi-ply exterior hem throughout the length thereof, shaping the blank to tubular longitudinally tapered form with its ends overlapping and with an annular exterior hem surrounding the large end of said body, securing said overlapping ends together to form the tubular body with a longitudinal seam, and radially expanding a portion of said body to an increased diameter to provide the same with an intermediate top annular exterior stop shoulder below said hem.

12. In the method of forming a tapered tubular flexible sheet material container body having a radially enlarged exterior surrounding top rim or hem and an annular exterior upper stop shoulder below said hem; those steps which include forming a tubular longitudinally tapered flexible sheet material body with a multi-ply exterior annular rim or hem of enlarged diameter exteriorly surrounding its upper end to provide an approximately cylindrical outer surface to fit the inner surface of the flange of an exterior slip cover for said container body; and then radially expanding an annular intermediate longitudinal portion of the wall of the upper portion of said body to an increased diameter and thereby providing said body with a permanent annular exterior stop shoulder below said hem and at the lower end of said portion of increased diameter.

13. In the method of forming a tapered tubular flexible sheet material container body having a radially enlarged exterior surrounding top rim or hem and an annular exterior upper stop shoulder below said hem; those steps which include forming a tubular longitudinally tapered flexible sheet material body with a multi-ply exterior annular rim or hem of enlarged diameter surrounding its upper end; and then radially expanding an annular intermediate longitudinal portion of the wall of the upper portion of said body immediately below said rim to an increased permanent diameter exteriorly approximately flush with and in downward continuation of the annular exterior surface of said hem and providing at the lower end of said enlarged expanded diameter portion an exterior annular stop shoulder.

RUTH OLIVER.
GEORGE R. PENN.